(12) United States Patent
Zelman

(10) Patent No.: US 6,932,471 B2
(45) Date of Patent: Aug. 23, 2005

(54) EYEGLASSES HAVING MAGNETICALLY COUPLED PRIMARY LENS FRAME AND AUXILIARY FRAME

(76) Inventor: Gary M. Zelman, 997 Flower Glen Rd., Simi Valley, CA (US) 93065

( * ) Notice: Subject to any disclaimer, the term of this patent is extended or adjusted under 35 U.S.C. 154(b) by 0 days.

(21) Appl. No.: 10/635,827

(22) Filed: Aug. 6, 2003

(65) Prior Publication Data

US 2005/0030472 A1 Feb. 10, 2005

(51) Int. Cl.⁷ ................................................. G02C 9/00
(52) U.S. Cl. ........................................... 351/47; 351/57
(58) Field of Search ............................. 351/47, 48, 57, 351/58, 124, 41, 44, 158

(56) References Cited

U.S. PATENT DOCUMENTS

| | | |
|---|---|---|
| 5,737,054 A | 4/1998 | Chao |
| 6,053,611 A | 4/2000 | Ku |
| 6,089,708 A | 7/2000 | Ku |
| 6,109,747 A * | 8/2000 | Chao ........................ 351/47 |
| 6,264,323 B1 | 7/2001 | Chao |
| 6,352,342 B1 | 3/2002 | Huang |
| 6,354,703 B1 | 3/2002 | Sadler |
| 6,474,810 B1 | 11/2002 | Ng |
| 6,488,372 B1 | 12/2002 | Park |
| 6,612,694 B2 | 9/2003 | Jagasia |
| 2003/0223031 A1 | 12/2003 | Fukuwa |

* cited by examiner

Primary Examiner—Hung Xuan Dang
(74) Attorney, Agent, or Firm—Trojan Law Offices

(57) ABSTRACT

Eyeglasses comprising a primary lens frame having a first pair of lens holders separated by a bridge portion having a major magnetic member disposed therein, said major magnetic member disposed within the bridge portion on a rear side of the bridge portion such that a surface of the major magnetic member is exposed and faces rearward. The eyeglasses further include an auxiliary frame having a second pair of lens holders separated by a bridge portion formed to include a protruding grip extension that extends perpendicularly outward from the auxiliary frame. The grip extension includes an upward lip with a minor magnetic member disposed therein such that a surface of the minor magnet member is exposed and faces forward. The auxiliary frame is coupled to the primary lens frame from the bottom such that the grip extension extends under the bridge portion in the primary lens frame and the upward lip engages the bridge portion of the primary lens frame on the rear side of the bridge, said major and minor magnetic members magnetically coupling together, thereby further securing the auxiliary frame to the primary lens frame.

22 Claims, 12 Drawing Sheets

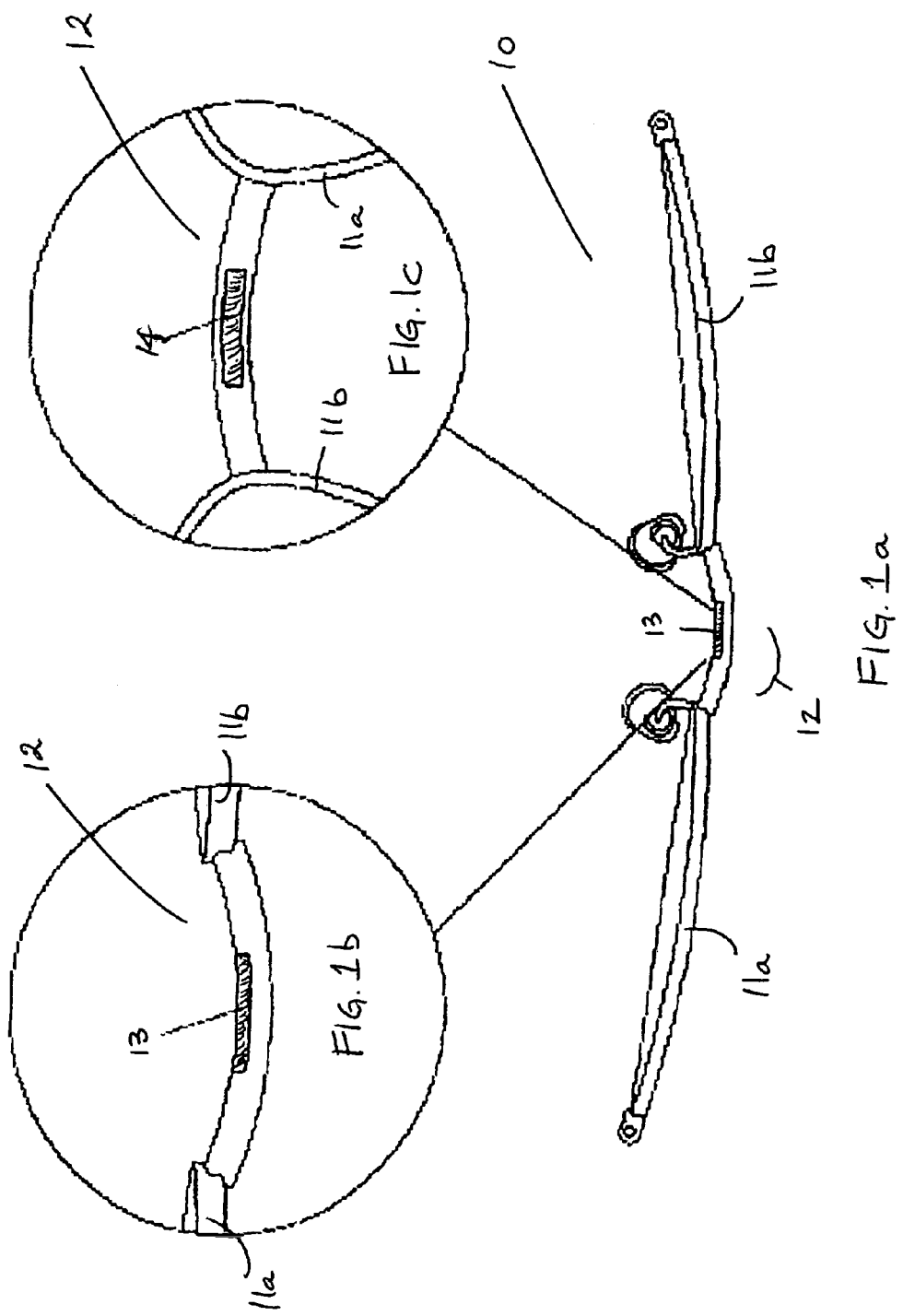

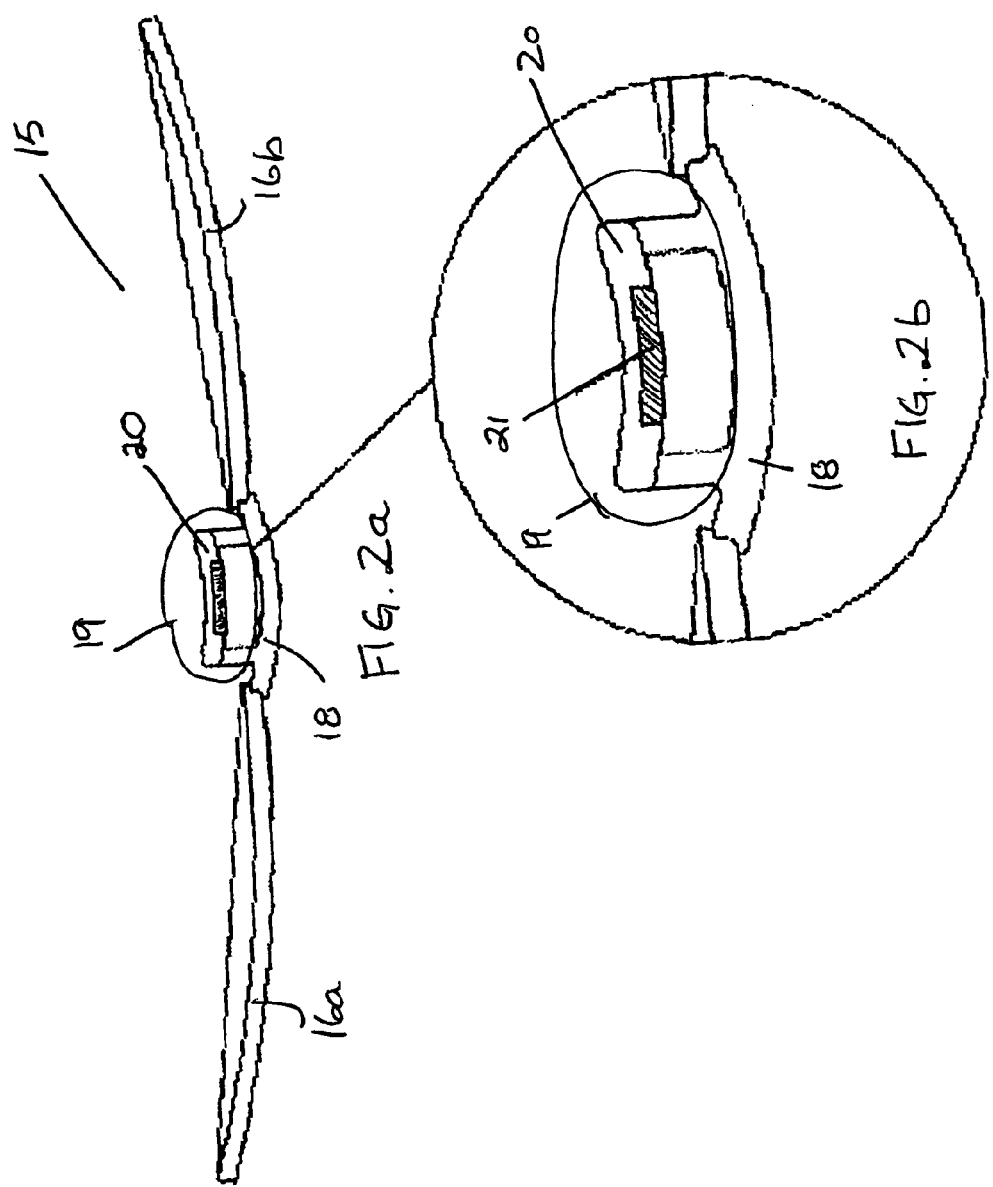

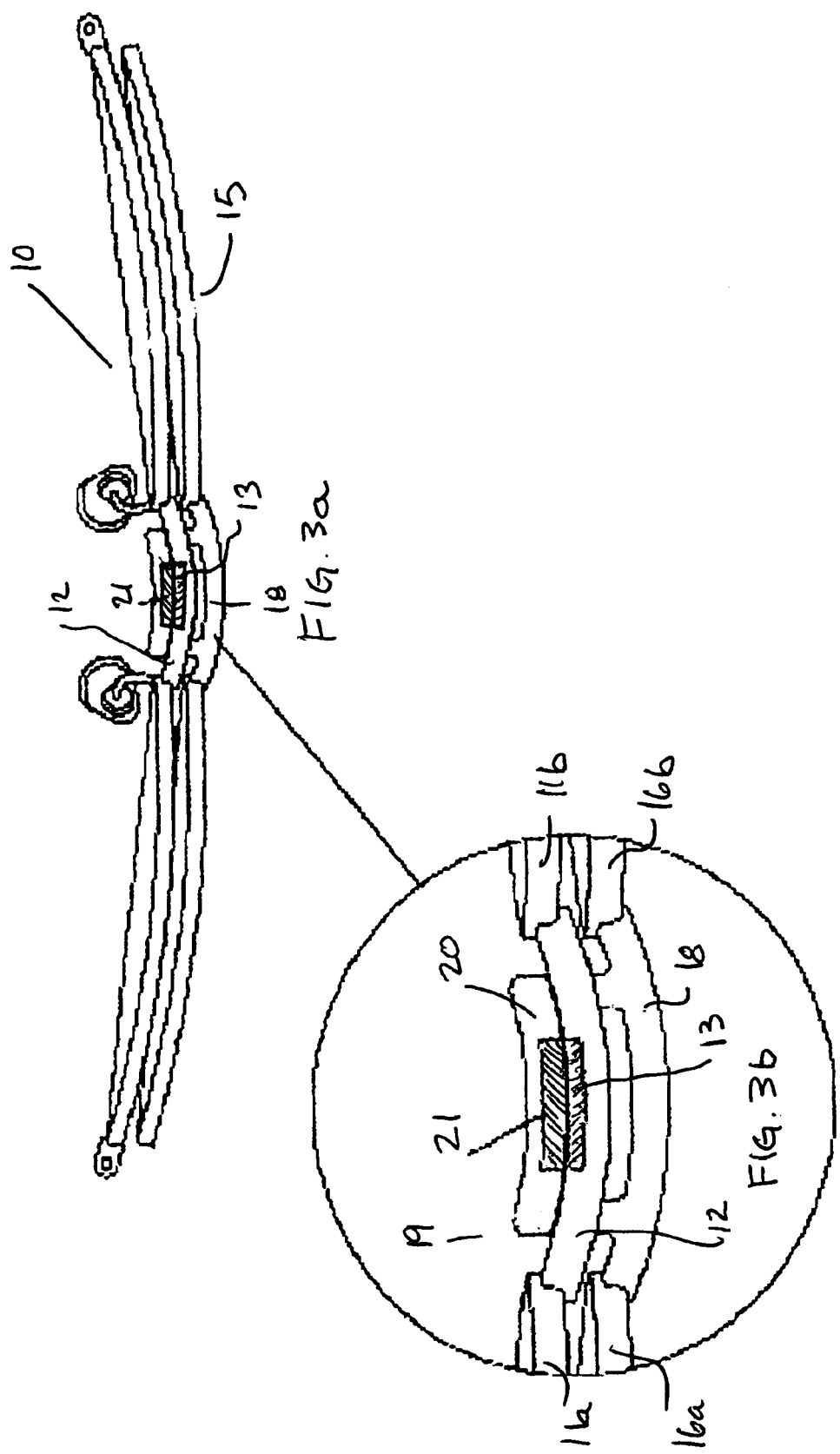

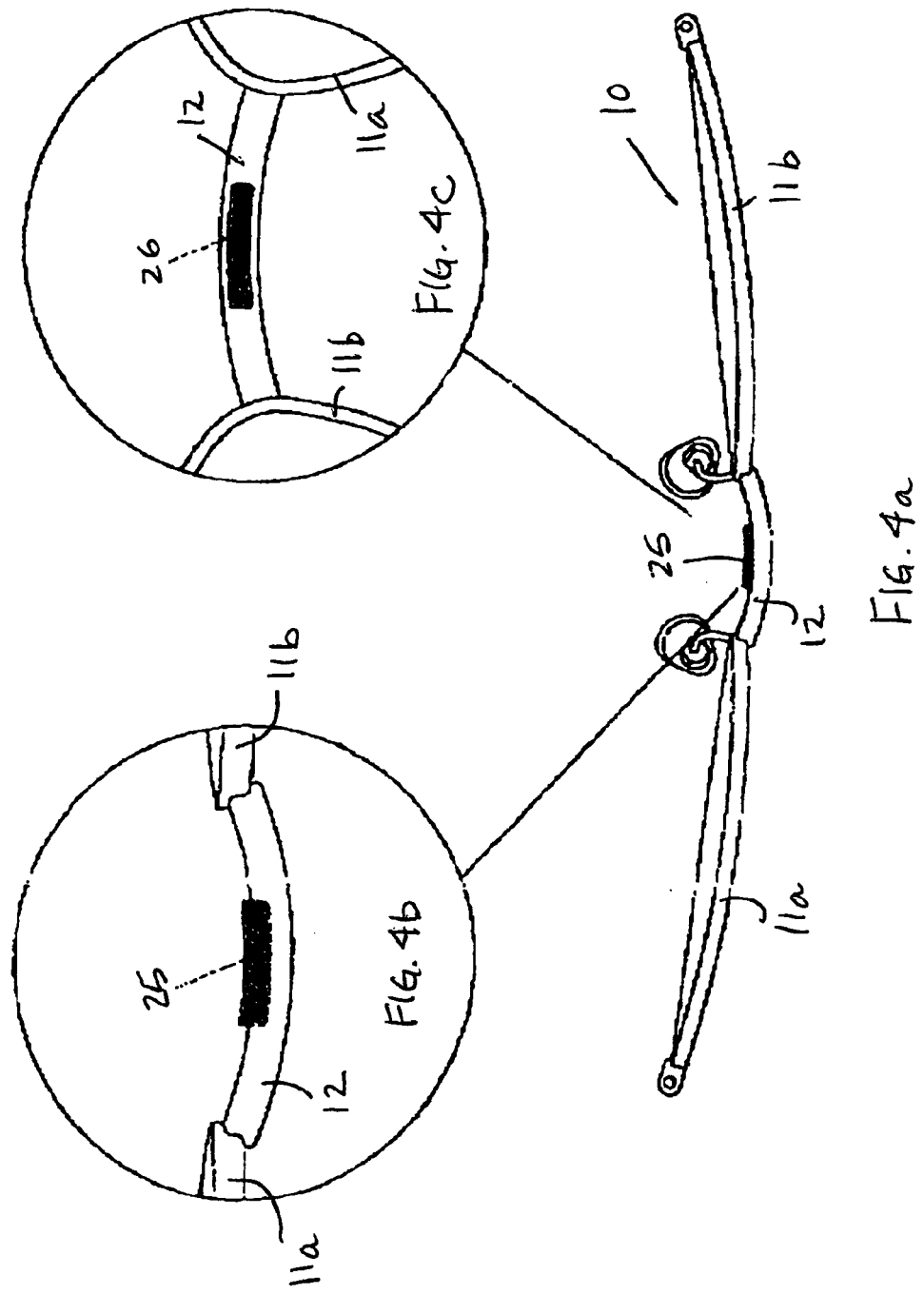

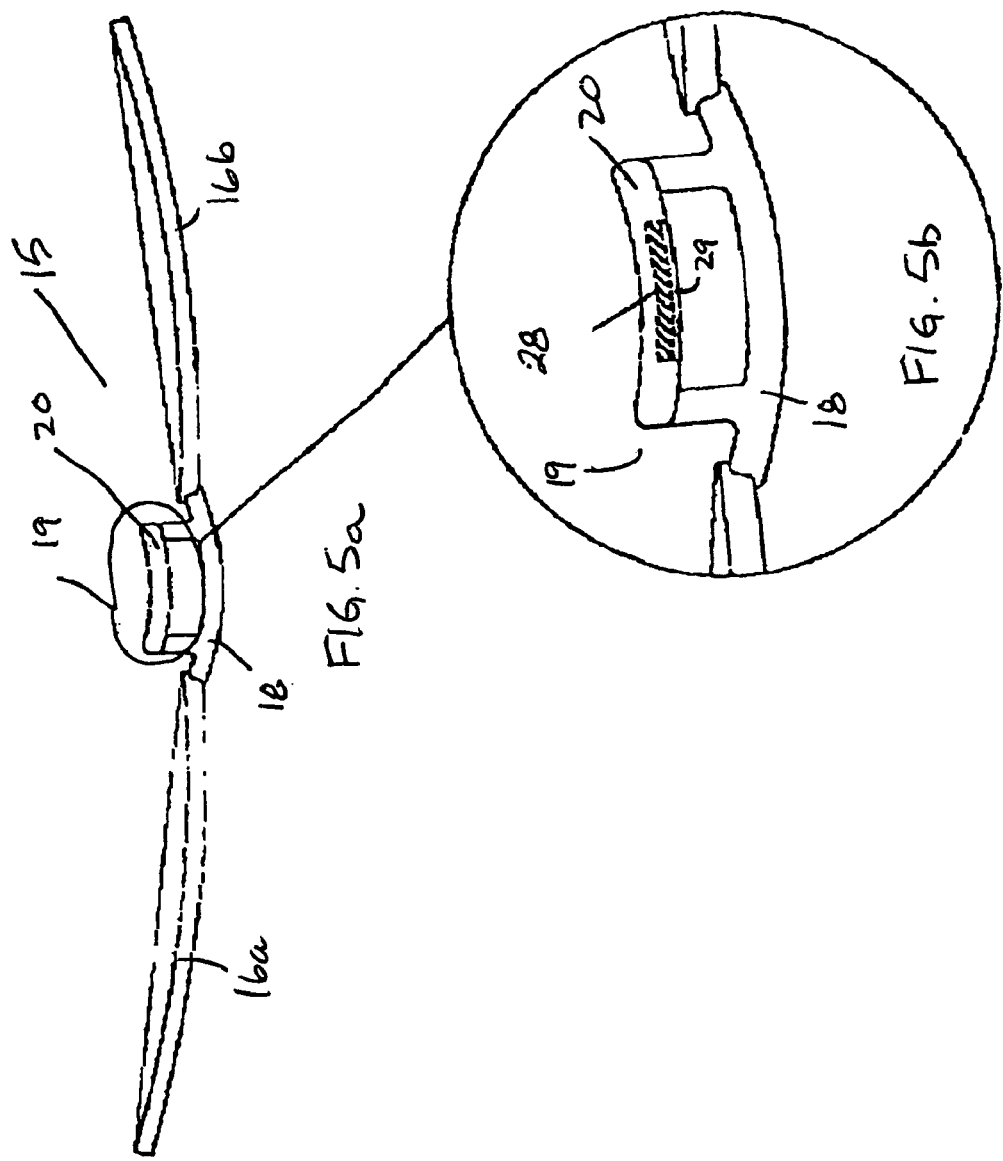

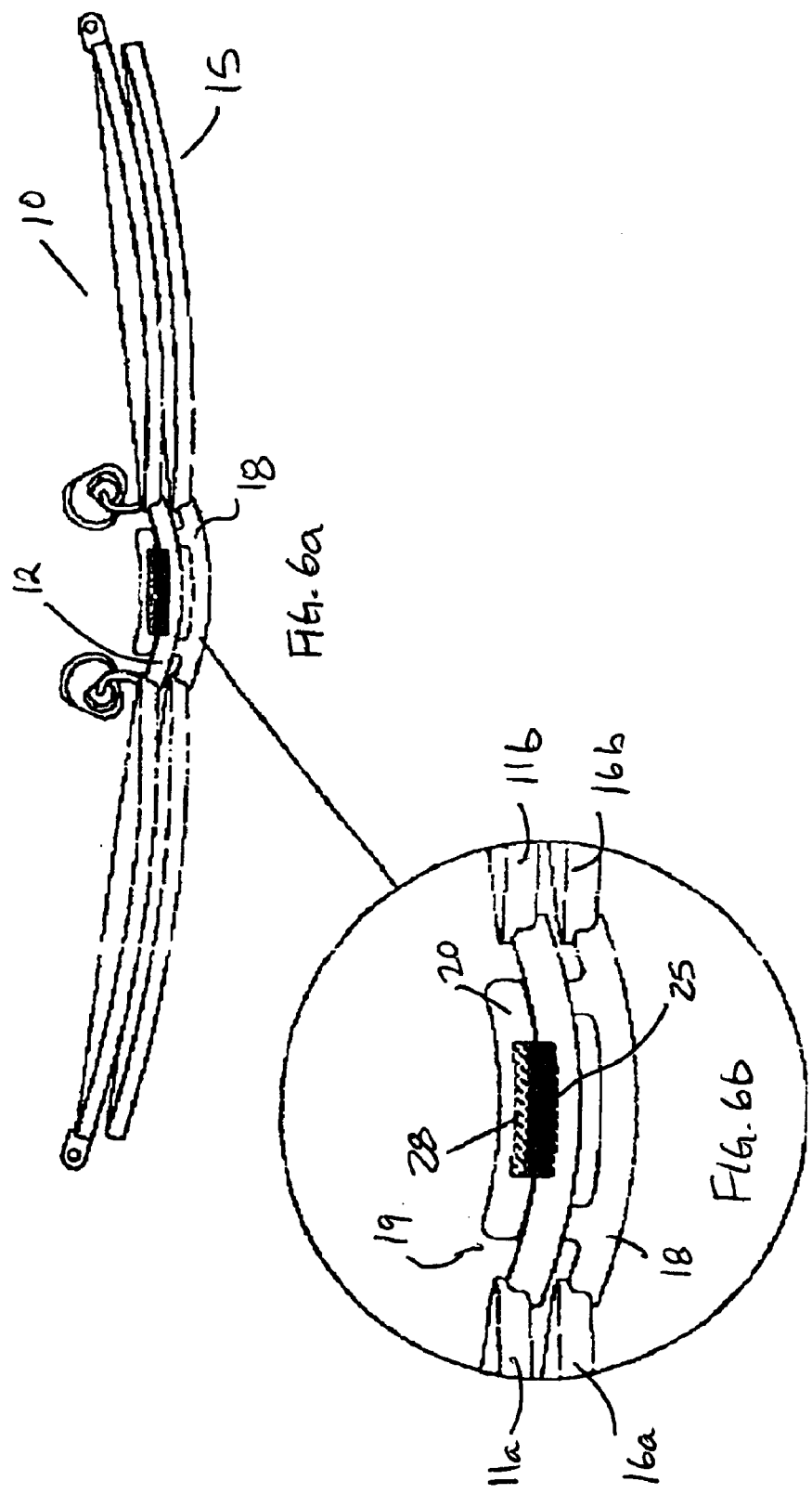

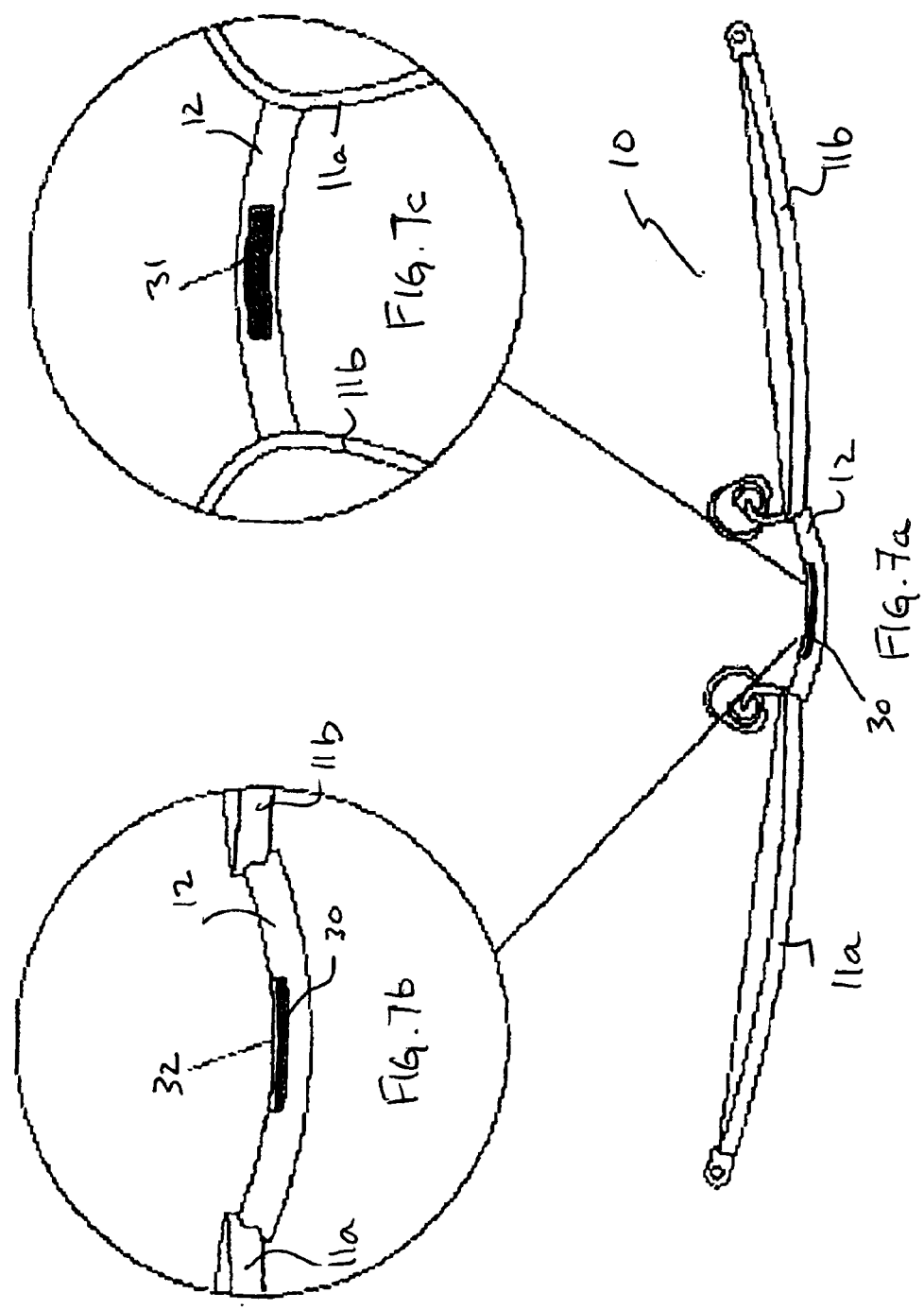

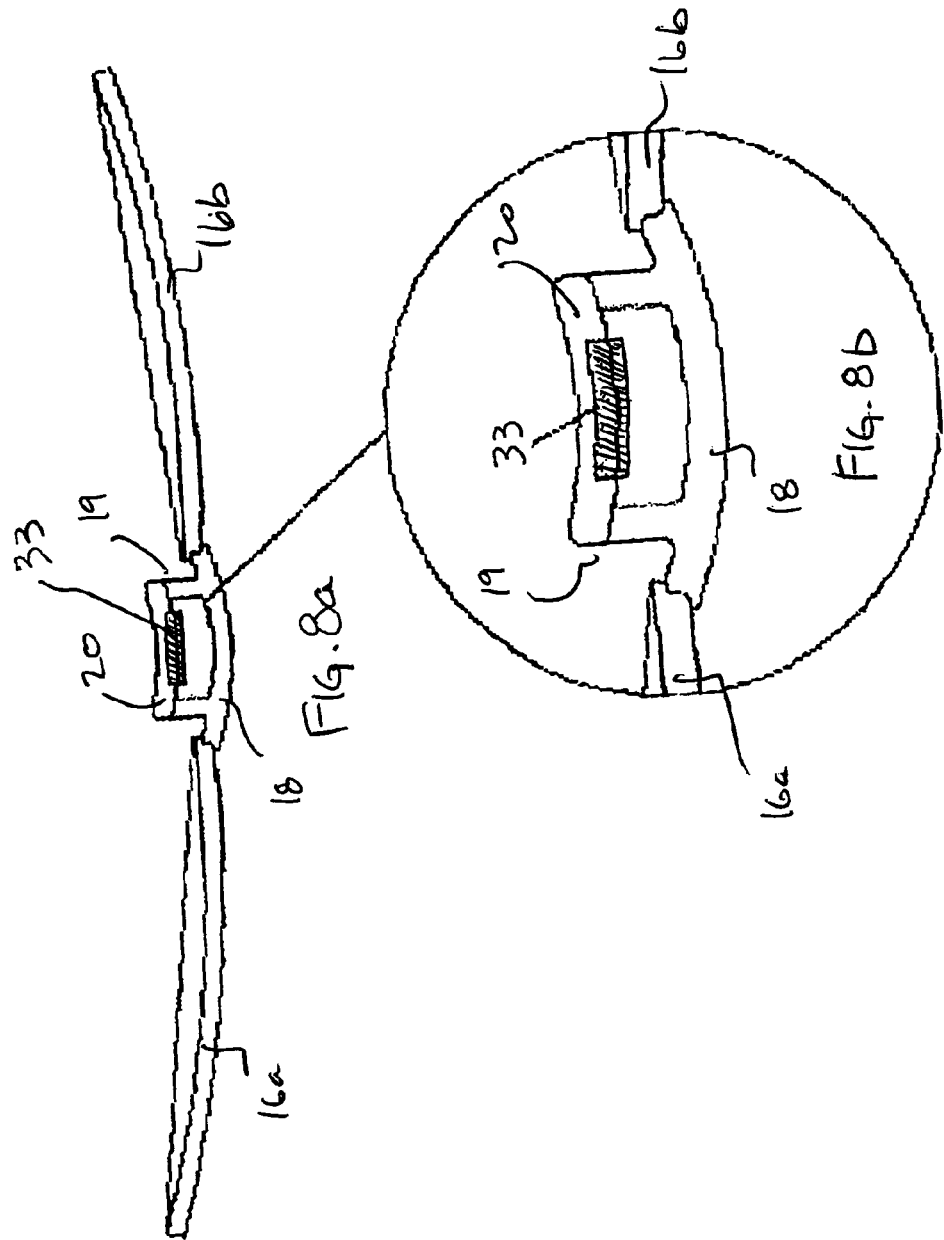

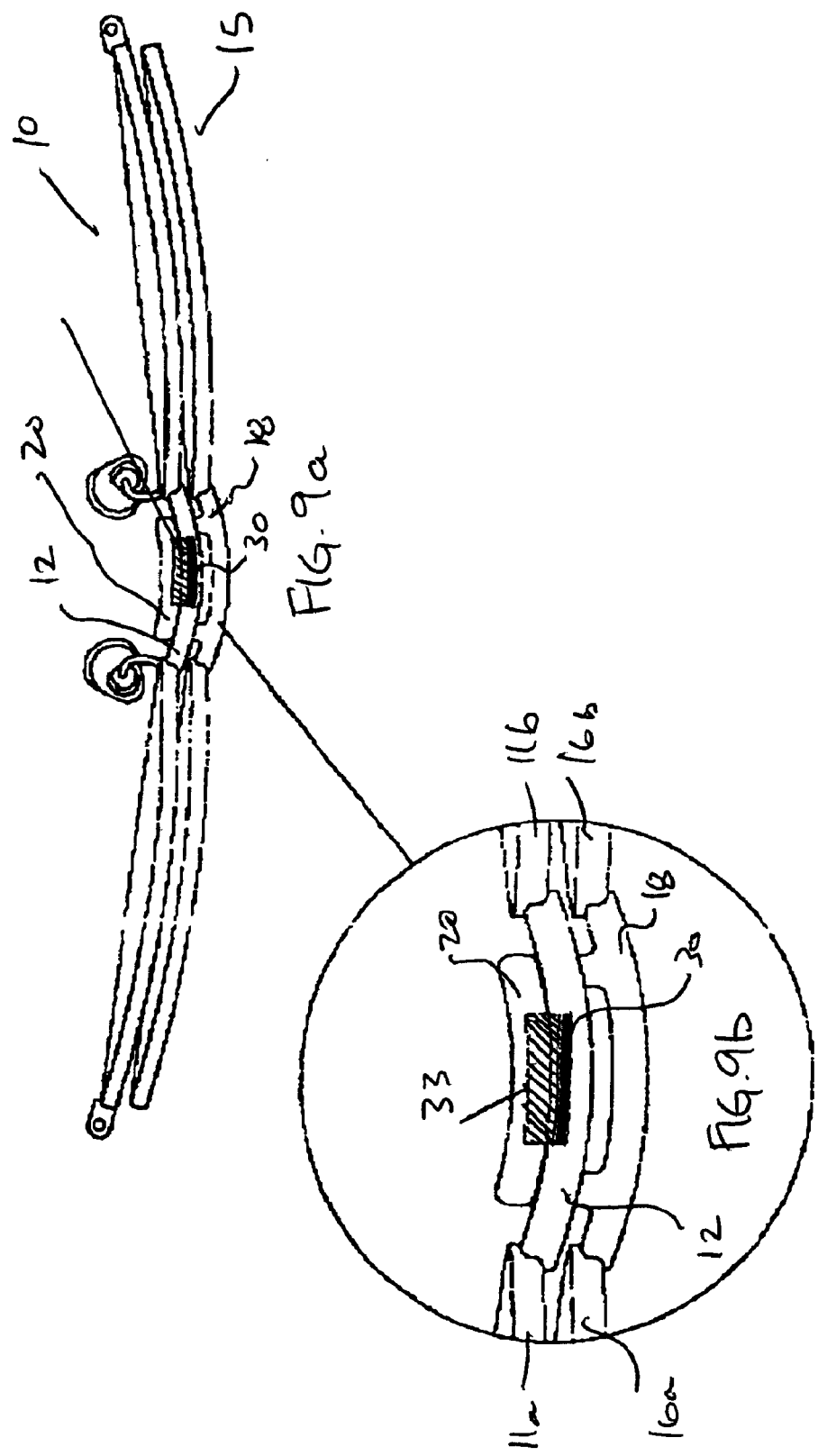

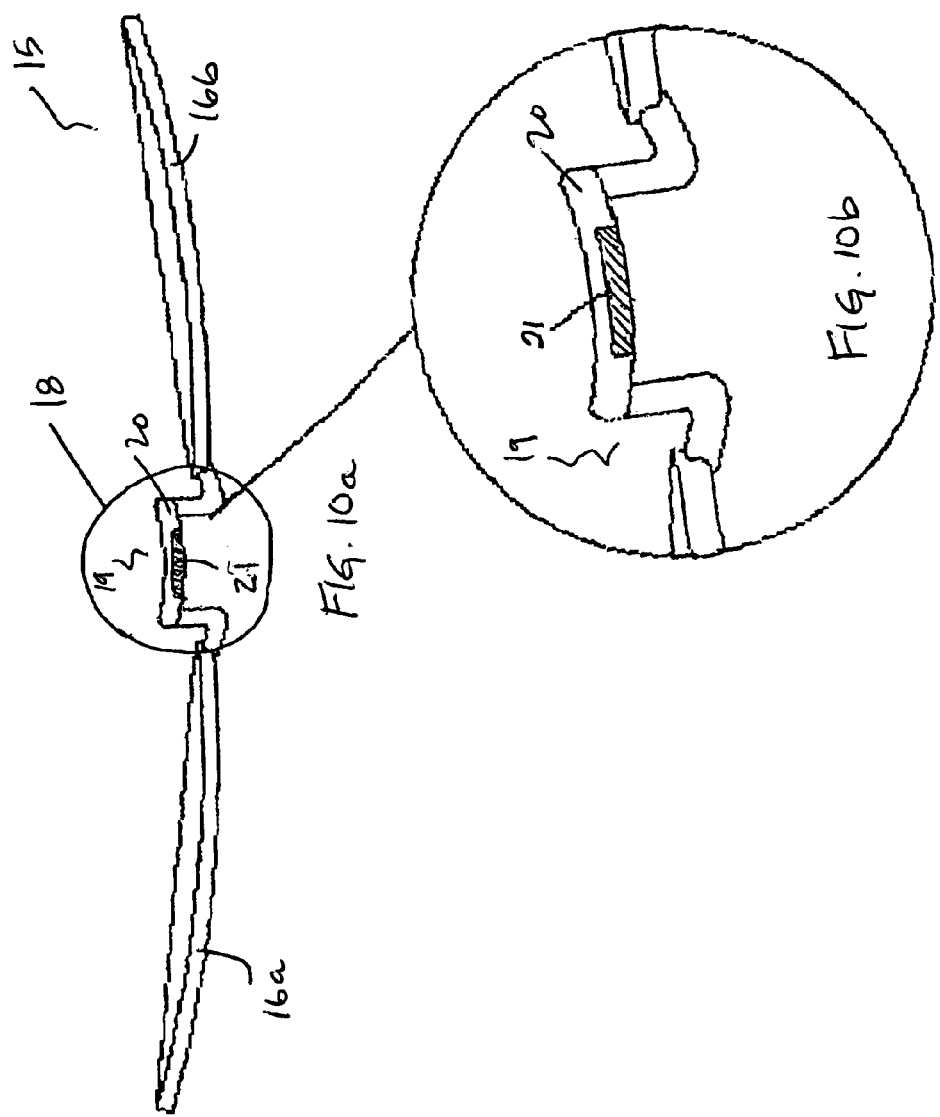

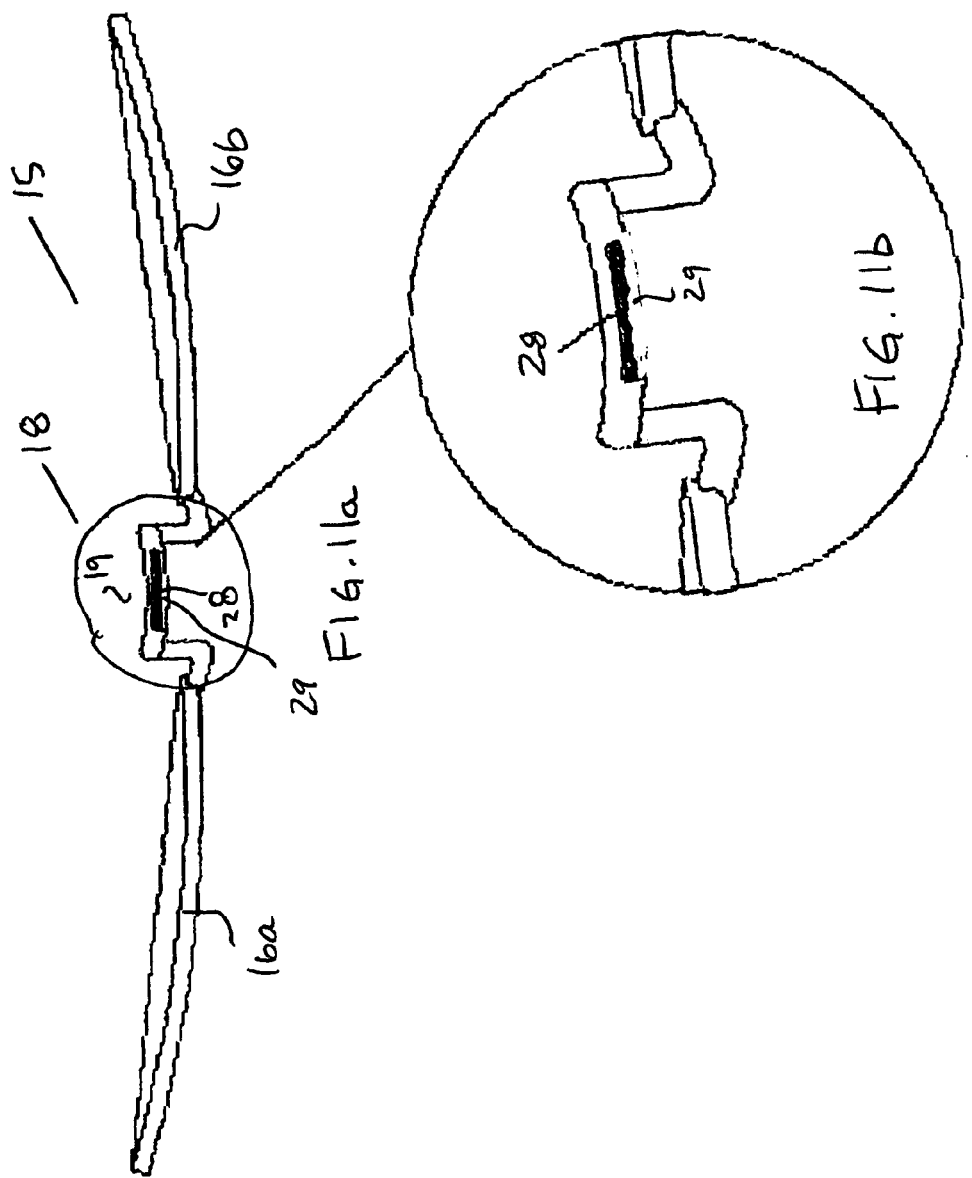

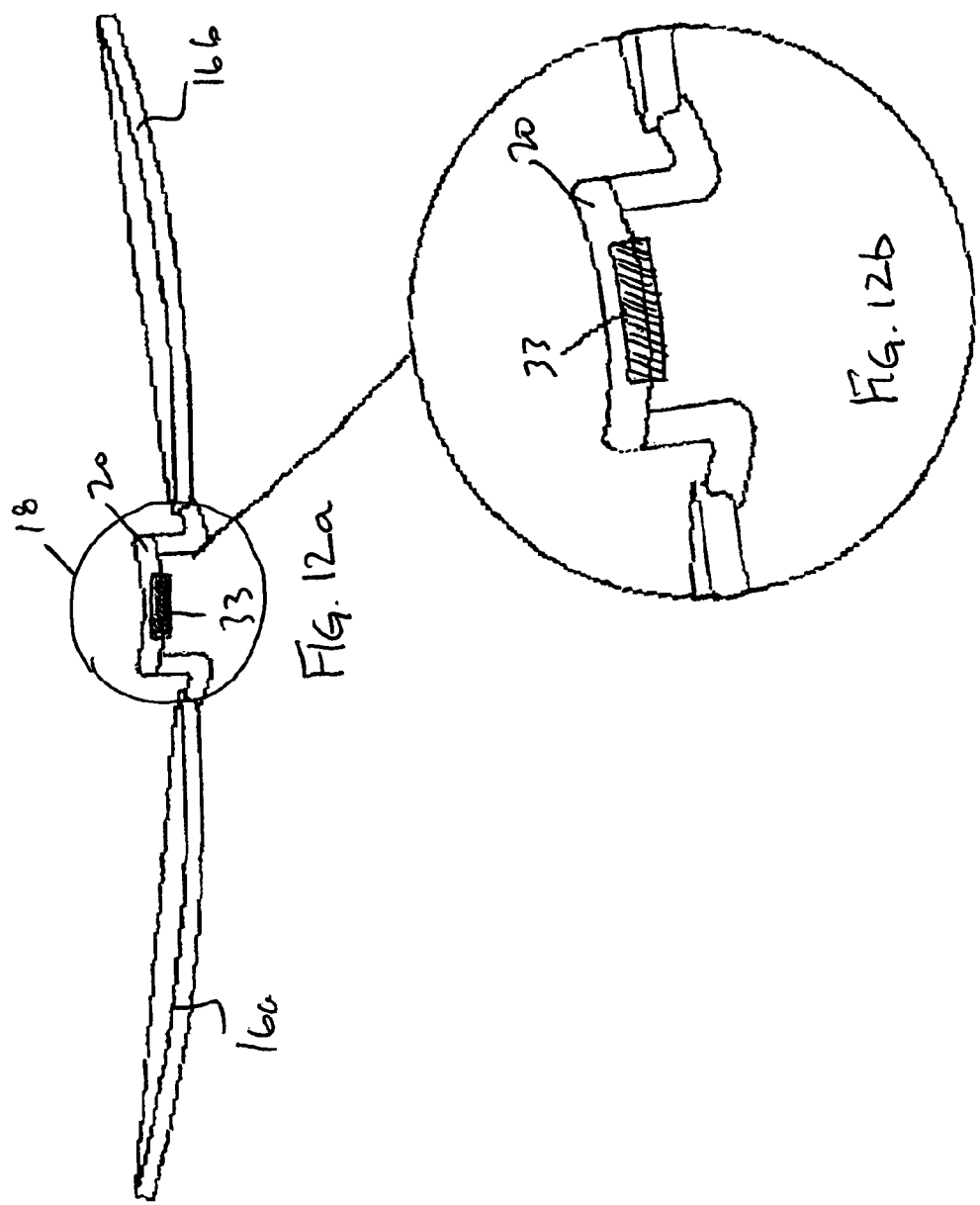

EYEGLASSES HAVING MAGNETICALLY COUPLED PRIMARY LENS FRAME AND AUXILIARY FRAME

FIELD OF THE INVENTION

The present invention relates to eyewear. More specifically, the invention relates to attachment of an auxiliary frame to a primary frame using magnetic members disposed within the bridges of both the auxiliary and primary frames.

DESCRIPTION OF THE PRIOR ART

It is well known in the art to attach an auxiliary frame with auxiliary lenses to a pair of primary eyeglasses. This has been achieved through various means, including the use of clips and/or magnetic members.

U.S. Pat. No. 5,416,537 issued to Sadler, et al. discloses a magnetic means for securing an auxiliary frame to a pair of primary eyeglasses using two pairs of magnetic members. A first pair of magnetic members is attached or coupled to the primary eyeglasses across the top of the primary frame. Each of the magnetic members in this first pair face upward and they are disposed at opposite ends of the primary frame, near the arms of the primary eyeglasses. A second pair of magnetic members is arranged on the auxiliary frame. Each of the magnetic members in this second pair extend outward, distally from the auxiliary frame, and face downward. These magnetic members in the second pair are arranged to engage the first pair of magnetic members from the top when the auxiliary frame is coupled to the primary eyeglasses.

One objective of the Sadler patent is to properly align and secure the auxiliary frame to the primary eyeglasses. However, the two pairs of magnetic members may not necessarily properly align and secure the auxiliary frame to the primary eyeglasses. For example, in this top mounted design, there can be some slippage or friction between the pairs of magnets when a user moves his head quickly, which may cause the auxiliary frame to misalign or altogether dislodge from the primary eyeglasses.

U.S. Pat. No. 5,737,054 issued to Chao, et al. also discloses a method for coupling an auxiliary spectacle frame to a primary frame of a pair of eyeglasses by using magnetic members. The primary frame of the eyeglasses includes a single magnetic connector member that is secured on top of the bridge in the middle portion of the bridge. This single magnetic connector faces upward. The auxiliary spectacle frame also includes a middle bridge portion having a projection for engaging or extending over the bridge of the primary frames from the top. The projection also includes a single magnetic connector member that faces downward. The single magnetic connector member in the projection engages the magnetic connector member in the bridge of the primary frame from the top when auxiliary spectacle frame and the primary frames are coupled together.

The main objective of the Chao patent is to secure the auxiliary frame to the primary frames while reducing the number of magnetic members from two pairs to a single pair of magnetic members. Reducing the number of magnetic members makes the eyeglasses lighter, reducing stress on the nose bridge when the eyeglasses are worn, and also makes the eyeglasses less expensive to manufacture. However, the Chao patent still suffers from the same shortcomings of the Sadler patent. More specifically, the Chao patent does not necessarily properly align and secure the auxiliary frame to the primary eyeglasses. As with the eyeglasses in the Sadler patent, the top mounted design utilized in the Chao patent still suffers from some slippage or friction between the single pair of magnets when a user moves his head quickly. As with the Sadler patent, this friction or slippage may cause the auxiliary frame to misalign or altogether dislodge from the primary eyeglasses.

Accordingly, what is needed is a more secure method for coupling an auxiliary frame to a primary frame in a pair of eyeglasses while reducing the number of magnetic members from two pairs to a single pair of magnetic members.

SUMMARY OF THE INVENTION

The primary object of the invention is to provide a pair of eyeglasses in which an auxiliary frame is securely coupled to a primary lens frame through the use of magnetic members. A second object of the invention is to do so while minimizing the number of magnetic members utilized.

Accordingly, in one aspect of the invention there is provided a pair of eyeglasses comprised of a primary lens frame having a first pair of lens holders for holding a first pair of lenses, said lens holders separated by a bridge portion. The bridge portion includes a major magnetic member that is preferably positioned on a rear side of the bridge portion, rather than on top of the bridge portion, such that a surface of the major magnetic member is exposed and faces rearward. The eyeglasses are further comprised of an auxiliary frame having a second pair of lens holders separated by a bridge portion. The bridge portion of the auxiliary frame is preferably formed to include a protruding grip extension that extends perpendicularly and laterally outward from the auxiliary frame. The grip extension includes an upward lip located at the distal end of the grip extension. Preferably, the upward lip is positioned at a distance approximately equal to the width of the bridge portion in the primary lens frame. This upward lip further includes a minor magnetic member positioned therein such that a surface of the minor magnet member is exposed and faces forward.

The auxiliary frame is coupled to the primary lens frame from the bottom such that the grip extension of the auxiliary frame extends under the bridge portion in the primary lens frame and the upward lip engages the bridge portion of the primary lens frame on the rear side of the bridge portion of the primary lens frame, said major and minor magnetic members magnetically coupling together, thereby further securing the auxiliary frame to the primary lens frame.

In a first preferred embodiment, the major magnetic member is positioned within the bridge portion of the primary lens frame such that the exposed surface of the major magnetic member is flush with the rear side of the bridge portion, thereby forming one cohesive and smooth surface on the rear side of the bridge portion. Likewise, the minor magnetic member is positioned within the upward lip of the grip extension of the auxiliary frame such that the exposed surface of the minor magnet member is flush with the front side of the upward lip, thereby forming one cohesive and smooth surface on the front side of the upward lip.

In a second preferred embodiment, the major magnetic member is positioned within the bridge portion of the primary lens frame such that the exposed surface of the major magnetic member is elevated from the rear side of the bridge portion, thereby extending or protruding outward from the rear side of the bridge portion. Likewise, the minor magnetic member is positioned within the upward lip of the grip extension of the auxiliary frame such that the minor magnet member is not flush with the front side of the upward lip; but, rather, is recessed therein, thereby forming a recess or aperture on the front side of the upward lip. In this second preferred embodiment, the major magnetic member extends from the primary lens frame and is inserted into the recess or aperture on the front side of the upward lip in the auxiliary lens frame, with the major and minor magnetic members then magnetically coupling together.

BRIEF DESCRIPTION OF THE DRAWINGS

FIGS. 1a through 1c illustrate top and rear perspective views of a primary lens frame in accordance with a first preferred embodiment of the present invention, said primary lens frame having a flushed magnetic member;

FIGS. 2a through 2b illustrate top perspective views of an auxiliary frame in accordance with a first preferred embodiment of the present invention, said auxiliary frame having a flushed magnetic member;

FIGS. 3a through 3b illustrate top perspective views of both the primary lens frame and the auxiliary frame when coupled together in a first preferred embodiment of the present invention in which flushed magnetic members are used to couple the auxiliary frame to the primary lens frame;

FIGS. 4a through 4c illustrate top and rear perspective views of a primary lens frame in accordance with a second preferred embodiment of the present invention, said primary lens frame having an extended magnetic member;

FIGS. 5a through 5b illustrate top perspective views of an auxiliary frame in accordance with a second preferred embodiment of the present invention, said auxiliary frame having a recessed magnetic member;

FIGS. 6a through 6b illustrate top perspective views of both the primary lens frame and the auxiliary frame when coupled together in a second preferred embodiment in which the extended magnetic member of the primary lens frame couples with the recessed magnetic member in the auxiliary frame thereby securing the auxiliary frame to the primary lens frame;

FIGS. 7a through 7c illustrate top and rear perspective views of a primary lens frame in accordance with a third preferred embodiment of the present invention, said primary lens frame having a recessed magnetic member;

FIGS. 8a through 8b illustrate top perspective views of an auxiliary frame in a third preferred embodiment of the present invention, said auxiliary frame having an extended magnetic member;

FIGS. 9a through 9b illustrate top perspectives view of both the primary lens frame and the auxiliary frame when coupled together in a third preferred embodiment in which the extended magnetic member of the auxiliary frame couples with the recessed magnetic member in the primary lens frame, thereby securing the auxiliary frame to the primary lens frame;

FIGS. 10a through 10b illustrate an alternative embodiment of the auxiliary lens frame having a flushed magnetic member;

FIGS. 11a through 11b illustrate an alternative embodiment of the auxiliary lens frame having an recessed magnetic member; and FIG. 12a through 12b illustrate an alternative embodiment of the auxiliary lens frame having an extended or elevated magnetic member.

DETAILED DESCRIPTION OF PREFERRED EMBODIMENTS

The invention is for a pair of eyeglasses having a primary lens frame and an auxiliary lens frame coupled together through the use of a single pair of magnetic members. Preferred embodiments of the present invention will now be described in detail with reference to the appended drawings, in which like elements are denoted with the same reference numerals.

FIGS. 1a through 1c illustrate top and rear perspective views of a primary lens frame in a first preferred embodiment of the present invention. As shown, the primary lens frame 10 includes a pair of lens holders 11a–b for holding a pair of primary lenses. The primary lens frame 10 may be made from plastic, metal, or any other suitable material known in the art. The lens holders 11a–b are separated by a bridge portion 12 which is disposed therebetween and preferably has a slightly curved shaped for fitting over a human nose when the primary eyeglasses are worn. The primary lens frame is preferably coupled to a pair of moveable arms (not shown) at opposite ends of the primary lens frame, said arms being moveable in an inward direction. The arms are designed to engage a human ear when the eyeglasses are used and may be spring loaded, allowing for some flexibility, in order to facilitate durability. Moreover, the arms may be made from a material different then the primary lens frame.

As described above, the lens holders 11a–b in the primary lens frame 10 are separated by a bridge portion 12, said bridge portion having front and rear sides along with a top and a bottom. The bridge portion 12 includes a major magnetic member 13 positioned therein or coupled thereto. The major magnetic member 13 is preferably positioned centrally and may be comprised of a permanent magnetic material or a ferromagnetic conductive material, as will be further described herein. In this first preferred embodiment the major magnetic member 13 is positioned on a rear side of the bridge portion 12 such that an exposed surface 14 of the major magnetic member 13 faces rearward, toward the human nose, when the eyeglasses are used.

FIG. 1b illustrates a top view blow-up of the bridge portion 12 separating the lens holders 11a–b in the primary lens frame 10 in a first preferred embodiment. FIG. 1c illustrates a rear side view blow-up of the bridge portion separating the lens holders 11a–b in the primary lens frame 10 in a first preferred embodiment. As shown in FIGS. 1b and 1c, in this first preferred embodiment, the major magnetic member 13 is preferably disposed within the bridge portion 12 such that an exposed surface 14 of the major magnetic member 13 is flush with the rear side of the bridge portion 12, thereby forming one cohesive and smooth surface on the rear side of the bridge portion 12.

Referring to FIG. 2a, a top perspective view of the auxiliary frame 15 in a first preferred embodiment of the present invention is illustrated. As shown, the auxiliary frame 15 also includes a pair of lens holders 16a–b separated by a bridge portion 18. The bridge portion 18 is preferably formed to include a protruding grip extension 19 disposed centrally within the bridge portion 18 and extending laterally outward from the auxiliary frame 15. The grip extension 19 is preferably rectangular in shape and includes an upward lip 20 at a distal end of the grip extension.

Referring to FIG. 2b, a top view of the bridge portion and grip extension in the auxiliary frame are shown. As shown, a minor magnetic member 21 is positioned within the upward lip 20 of the grip extension 19 in the bridge portion 18 such that a surface of the minor magnetic member 20 is exposed and visible on a front side (not shown) of the upward lip 20. The minor magnetic member 21 may be comprised of a permanent magnetic material or a ferromagnetic conductive material. In the first preferred embodiment, the minor magnetic member 21 is positioned at the front of the upward lip 20 of the grip extension 19 such that the exposed surface of the minor magnet member 20 faces forward, toward the front of the auxiliary frame 15, said exposed surface preferably being flush with the front side of the upward lip 20, thereby forming one cohesive and smooth surface on the front side of the upward lip 20.

FIG. 3*a* illustrates a top perspective view of both the primary lens frame 10 and the auxiliary frame 15 when coupled together in the first preferred embodiment. FIG. 3*b* illustrates a top perspective view blow up of the bridge portion 18, grip extension 19 and the upward lip 20 of the auxiliary frame 15 as coupled with the bridge 12 of the primary lens frame 10. As illustrated in FIGS. 3*a* and 3*b*, the auxiliary frame 15 is coupled to the primary lens frame 10 from the bottom such that the grip extension 19 of the auxiliary frame 15 extends under the bridge 12 in the primary lens frame 10 and the upward lip 20 engages the bridge 12 on the rear side of the bridge, wherein the major magnetic member 13 in the primary lens frame magnetically couples to the minor magnetic member 21 in the auxiliary frame, thereby securing the auxiliary frame to the primary lens frame. As discussed earlier, the major and minor magnetic members may be comprised of either permanent magnetic material or ferromagnetic material. In this first preferred embodiment, at least one of either the major or minor magnetic members should be comprised of permanent magnetic material, in order for continued magnetic attraction to exist over time.

FIGS. 4*a* through 4*c* illustrate top and rear perspective views of a primary lens frame in accordance with a second preferred embodiment of the present invention. As with the primary lens frame 10 in the first preferred embodiment, the primary lens frame in a second preferred embodiment includes a pair of lens holders 11*a*–*b* for holding a pair of primary lenses. Once again, the primary lens frame in the second preferred embodiment may be made from plastic, metal, or any other suitable material known in the art. The lens holders 11*a*–*b* are separated by a bridge portion 12, disposed therebetween, and preferably having a slightly curved shaped for fitting over a human nose when the primary eyeglasses are worn. The primary lens frame 10 is again coupled to a pair of moveable arms (not shown), distally positioned at opposite ends of the primary lens frame and moveable in an inward direction. The arms are designed to engage a human ear when the eyeglasses are used and may be spring loaded in order to facilitate durability.

The bridge portion 12 on the primary lens frame 10 further includes a major magnetic member 25. The major magnetic member 25 may be comprised of a permanent magnetic material or a ferromagnetic conductive material, as will be further described herein. In this second preferred embodiment the major magnetic member 25 is positioned within the bridge portion on a rear side such that an exposed surface 26 of the major magnetic member 25 faces rearward, toward the human nose, when the eyeglasses are used.

FIG. 4*b* illustrates a top view blow-up of the bridge portion separating the lens holders in the primary lens frame in the second preferred embodiment. FIG. 4*c* illustrates a rear view blow-up of the bridge portion separating the lens holders in the primary lens frame in the second preferred embodiment. As shown in FIGS. 4*b* and 4*c*, the major magnetic member 25 is disposed within the bridge portion of the primary lens frame 10 such that is elevated and extends or protrudes from the rear side of the bridge portion. Accordingly, unlike the first preferred embodiment, the major magnetic member 25 is not flush with the rear side of the bridge portion 12. Rather, it extends or protrudes outward, therefrom, in a rearward direction.

Referring to FIGS. 5*a* through 5*b*, top views of an auxiliary frame 15 in a second preferred embodiment of the present invention are illustrated. Once again, the auxiliary frame in the second preferred embodiment may be made from plastic, metal, or any other suitable material known in the art. As shown, the auxiliary frame 15 in the second preferred embodiment also includes a pair of lens holders 16*a*–*b* separated by a bridge portion 18. The bridge portion 18 in the auxiliary frame 15 includes a grip extension 19 protruding perpendicularly and laterally from the auxiliary frame in a rearward direction. The grip extension 19 is preferably rectangular in shape and includes an upward lip 20. A minor magnetic member 28 is positioned within the upward lip 20 of the grip extension such that an exposed surface of the minor magnet member 28 is visible on a front side (not shown) of the upward lip 20. The minor magnetic member may be comprised of permanent magnetic material or a ferromagnetic material.

In this second preferred embodiment, the minor magnetic member 28 is disposed within the upward lip 20 of the grip extension such that the exposed surface of the minor magnet member 28 faces outward and forward, but is recessed from the front side of the upward lip 20. Accordingly, unlike the first preferred embodiment, the minor magnet member 28 is not flush with the front side of the upward lip; but, rather, is recessed therefrom, thereby forming a recess or aperture 29 on the front side of the upward lip 20.

FIG. 6*a* illustrates a top perspective view of both the primary lens frame 10 and the auxiliary frame 15 when coupled together in a second preferred embodiment. FIG. 6*b* illustrates a top perspective view blow up of the bridge portion, the grip extension 19, and the upward lip 20 of the auxiliary frame, along with the bridge 12 of the primary lens frame 10. As illustrated in FIGS. 6*a* and 6*b*, the auxiliary frame is coupled to the primary lens frame from the bottom such that the grip extension 19 of the auxiliary frame extends under the bridge 12 in the primary lens frame and the upward lip 20 engages the bridge of the primary lens frame on the rear side of the bridge, with the major magnetic member 25 in the primary lens frame being inserted into the recess or aperture on the front side of the upward lip 20 and further being magnetically coupled to the minor magnetic member 28 in the auxiliary frame, thereby securing the auxiliary frame to the primary lens frame. As discussed earlier, the major and minor magnetic members may be comprised of either permanent magnetic material or ferromagnetic material. In this first preferred embodiment, at least one of either the major or minor magnetic members should be comprised of permanent magnetic material, in order for continued magnetic attraction to exist over time.

FIGS. 7*a* through 7*c* illustrate a top perspective view of the eyeglasses in yet a third preferred embodiment of the present invention. As with the eyeglasses in the first and second preferred embodiments, the eyeglasses in this third preferred embodiment are comprised of a primary lens frame 10 having a pair of lens holders 11*a*–*b* for holding a pair of primary lenses. Once again, the primary lens frame in the third preferred embodiment may be made from plastic, metal, or any other suitable material known in the art. The lens holders 11*a*–*b* are separated by a bridge portion 12, disposed therebetween, and preferably having a slightly curved shaped for fitting over a human nose when the primary eyeglasses are worn. The primary lens frame 10 is coupled to a pair of moveable arms (not shown) distally positioned at opposite ends of the primary lens frame and moveable relative thereto in an inward direction. The arms are designed to engage a human ear when the eyeglasses are used and may be spring loaded in order to facilitate durability.

As described with reference to the first and second preferred embodiments, the lens holders 11*a*–*b* in the third preferred embodiment are separated by a bridge portion 12 which includes a major magnetic member 30. The major magnetic member 30 may be comprised of a permanent magnetic material or a ferromagnetic material, as will be further described herein. In this third preferred embodiment, the major magnetic member 30 is positioned centrally within the bridge portion on a rear side of the bridge portion such that an exposed surface 31 of the major magnetic member 30 faces rearward, toward the human nose, when the eyeglasses are used.

FIG. 7b illustrates a top view blow-up of the bridge portion in the primary lens frame 10 in the third preferred embodiment of the present invention. FIG. 7c illustrates a rear view blow-up of the bridge portion in the primary lens frame in the third preferred embodiment. As shown in FIGS. 7b and 7c, the major magnetic member 30 is disposed within the bridge portion of the primary lens frame 10 such that it is recessed within the bridge. Accordingly, unlike the first preferred embodiment, the major magnetic member 30 in the third preferred embodiment is not flush with the rear side of the bridge portion 12. Rather, it is recessed within the bridge portion of the primary lens frame, thereby forming a recess or aperture 32 within the bridge portion of the primary lens frame.

Referring to FIGS. 8a through 8b, a top view of the auxiliary frame 15 in the third preferred embodiment of the present invention is illustrated. Once again, the auxiliary frame in the third preferred embodiment may be made from plastic, metal, or any other suitable material known in the art. As shown, the auxiliary frame 15 also includes a pair of lens holders 16a–b separated by a bridge portion 18. The bridge portion 18 in the auxiliary frame 15 also includes a grip extension 19 protruding perpendicularly and extending laterally from the auxiliary frame in a rearward direction. As with the first and second preferred embodiments, the grip extension is preferably rectangular in shape and includes an upward lip 20. A minor magnetic member 33 is positioned within the upward lip 20 of the grip extension such that an exposed surface of the minor magnet member 33 is visible on a front side (not shown) of the upward lip 20. The minor magnetic member may be comprised of permanent magnetic material or a ferromagnetic material.

In this third preferred embodiment, the minor magnetic member 33 is disposed within the upward lip 20 of the grip extension such that the exposed surface of the minor magnet member faces outward and is elevated above the front side of the upward lip 20. Accordingly, unlike the first preferred embodiment, the minor magnet member 33 is not flush with the front side of the upward lip; but, rather, it extends and protrudes outward from the front side of the upward lip 20.

FIG. 9a illustrates a top perspective view of both the primary lens frame 10 and the auxiliary frame 15 when coupled together in this third preferred embodiment. FIG. 9b illustrates a top perspective view blow up of the bridge, the grip extension 19, and the upward lip 20 of the auxiliary frame along with the bridge 12 of the primary lens frame 10. As illustrated in FIGS. 9a and 9b, the auxiliary frame is coupled to the primary lens frame from the bottom such that the grip extension 19 of the auxiliary frame extends under the bridge 12 in the primary lens frame and the upward lip 20 engages the bridge of the primary lens frame on the rear side of the bridge with the minor magnetic member 33 in the auxiliary frame being inserted into the recess or aperture on the rear side of the bridge in the primary lens frame and the major and minor magnetic members magnetically coupling together, thereby securing the auxiliary frame to the primary lens frame.

As discussed earlier, the major and minor magnetic members may be comprised of either permanent magnet material or ferromagnetic material. In this third preferred embodiment, at least one of either the major or minor magnetic members should be comprised of permanent magnetic material, in order for continued magnetic attraction to exist over time.

FIGS. 10a through 10b illustrate an alternative embodiment of the auxiliary lens frame having a flushed magnetic member. As shown in this alternative embodiment, the bridge portion 18 in the auxiliary frame 15 is actually shaped to form the grip extension. Accordingly, in this alternative embodiment, the bridge portion of the auxiliary frame is both a bridge 18 and a grip extension 19. As with the preferred embodiments, the bridge portion in this alternative embodiment includes an upward lip 20 disposed at a distal end of the bridge. In the alternative embodiment illustrated in FIGS. 10a and 10b, a minor magnetic member 21 is centrally positioned within the upward lip of the bridge portion such that an exposed surface of the minor magnetic member faces forward on a front side of the upward lip and is flush with the front side of the upward lip, thereby forming one cohesive and smooth surface on the front side of the upward lip. The minor magnetic member 21 may be comprised of permanent magnetic material or ferromagnetic material. FIGS. 11a through 11b illustrate an alternative embodiment of the auxiliary frame 15 wherein the bridge portion 18 in the auxiliary lens frame is actually shaped to form the grip extension 19 and the minor magnetic member 28 is recessed within the upward lip of the bridge portion, thereby forming a recess or aperture 29 on the front side of the upward lip. FIG. 12a through 12b illustrate an alternative embodiment of the auxiliary frame 15 wherein the bridge portion 18 in the auxiliary frame is actually shaped to form the grip extension 19 and the minor magnetic member 33 is elevated from the upward lip, thereby extending or protruding outward from the front side of the upward lip 20.

The invention has been described with reference to several different preferred and alternative embodiments and it is understood that any modifications thereto or alternate combinations thereof which would be readily apparent to one of ordinary skill in the art are intended to be encompassed. Therefore, the aforementioned descriptions are in no way intended to limit the breadth or scope of the invention as claimed hereinafter.

What is claimed is:

1. An eyeglass apparatus comprising:
    a primary lens frame having a first pair of lens holders for holding a pair of primary lenses and separated by a bridge portion disposed therebetween, said bridge portion having a major magnetic member disposed therein, said major magnetic member disposed within the bridge portion on a rear side of the bridge portion such that a surface of the major magnetic member is exposed and faces rearward;
    an auxiliary frame having a pair of lens holders separated by a bridge portion, said bridge portion formed to include a protruding grip extension which extends perpendicularly outward from the auxiliary frame, said grip extension having an upward lip with a minor magnetic member disposed therein such that a surface of the minor magnet member is exposed and faces forward;
    said auxiliary frame coupled to the primary lens frame from the bottom such that the grip extension of the auxiliary frame extends under the bridge portion in the primary lens frame and the upward lip engages the bridge of the primary lens frame on the rear side of the bridge, said major magnetic member in the primary lens frame magnetically coupling to the minor magnetic member in the auxiliary frame, thereby further securing the auxiliary frame to the primary lens frame.

2. The eyeglass apparatus of claim 1, wherein the major magnetic member is disposed within the bridge portion such that the exposed surface of the major magnetic member is flush with the rear side of the bridge portion, thereby forming one cohesive and smooth surface on the rear side of the bridge portion.

3. The eyeglass apparatus of claim 2, wherein the minor magnetic member is disposed within the upward lip of the grip extension such that the exposed surface of the minor magnet member is flush with the front side of the upward lip, thereby forming one cohesive and smooth surface on the front side of the upward lip.

4. The eyeglass apparatus of claim 1, wherein the major magnetic member is disposed within the bridge portion such that it is elevated and extends or protrudes therefrom.

5. The eyeglass apparatus of claim 4, wherein the minor magnetic member is disposed within the upward lip of the grip extension such that the minor magnet member is not flush with the front side of the upward lip; but, rather, is recessed therefrom, thereby forming a recess or aperture on the front side of the upward lip.

6. The eyeglass of claim 5, wherein the major magnetic member extending from the rear side of the bridge portion in the primary lens frame is inserted into the recess or aperture on the front side of the upward lip, said major and minor magnetic members then magnetically coupling together.

7. The eyeglass apparatus of claim 1, wherein the major magnetic member is disposed within the bridge portion such that it is recessed.

8. The eyeglass apparatus of claim 7, wherein the minor magnetic member is disposed within the upward lip of the grip extension such that the minor magnet member is not flush with the front side of the upward lip; but, rather, is elevated from a front surface of the upward lip, thereby extending or protruding from the front side of the upward lip.

9. The eyeglass of claim 8, wherein the minor magnetic member in the auxiliary frame is inserted into the recess or aperture on the rear side of the bridge portion of the primary lens frame, said major and minor magnetic members then magnetically coupling together.

10. An eyeglass apparatus comprising:
an auxiliary frame having a pair of lens holders separated by a bridge portion formed to include a protruding grip extension which extends perpendicularly outward from the auxiliary frame, said grip extension having an upward lip with a minor magnetic member disposed therein such that a surface of the minor magnet member is exposed and faces forward thereby magnetically coupling to a major magnetic member in a primary lens frame in order to secure the auxiliary frame to the primary lens frame.

11. The eyeglass apparatus of claim 10, wherein the minor magnetic member is disposed within the upward lip of the grip extension such that the exposed surface of the minor magnet member is flush with the front side of the upward lip, thereby forming one cohesive and smooth surface on the front side of the upward lip.

12. The eyeglass apparatus of claim 10, wherein the minor magnetic member is disposed within the upward lip of the grip extension such that the exposed surface of the minor magnet member is not flush with the front side of the upward lip; but, rather, is recessed therefrom, thereby forming a recess or aperture on the front side of the upward lip.

13. The eyeglass apparatus of claim 10, wherein the minor magnetic member is disposed within the upward lip of the grip extension such that the exposed surface of the minor magnet member is not flush with the front side of the upward lip; but, rather, is elevated from a front surface of the upward lip, thereby extending or protruding from the front side of the upward lip.

14. A method for forming a pair of eyeglasses comprising:
constructing a primary lens frame having a first pair of lens holders, for holding a pair of primary lenses, and separated by a bridge portion disposed therebetween, said bridge portion having a major magnetic member disposed therein;

constructing an auxiliary frame having a second pair of lens holders separated by a bridge portion, said bridge portion formed to include a protruding grip extension which extends perpendicularly outward from the auxiliary frame, and said grip extension having an upward lip with a minor magnetic member disposed therein;

coupling the auxiliary frame to the primary lens frame from the bottom such that the grip extension of the auxiliary frame extends under the bridge portion in the primary lens frame and the upward lip engages the bridge of the primary lens frame on the rear side of the bridge, said major magnetic member in the primary lens frame magnetically coupling to the minor magnetic member in the auxiliary frame, thereby further securing the auxiliary frame to the primary lens frame.

15. The method of claim 14, wherein the major magnetic member is disposed within the bridge portion such that the exposed surface of the major magnetic member is flush with the rear side of the bridge portion, thereby forming one cohesive and smooth surface on the rear side of the bridge portion.

16. The method of claim 15, wherein the minor magnetic member is disposed within the upward lip of the grip extension such that the exposed surface of the minor magnet member is flush with the front side of the upward lip, thereby forming one cohesive and smooth surface on the front side of the upward lip.

17. The method of claim 14, wherein the major magnetic member is positioned within the bridge portion of the primary lens frame such that it is elevated, thereby extending or protruding from a rear surface of the bridge portion.

18. The method of claim 17, wherein the minor magnetic member is disposed within the upward lip of the grip extension such that the minor magnet member is not flush with the front side of the upward lip; but, rather, is recessed therein, thereby forming a recess or aperture on the front side of the upward lip.

19. The method of claim 18, wherein the major magnetic member in the primary lens frame is inserted into the recess or aperture on the front side of the upward lip and the major and minor magnetic members are then magnetically coupled together.

20. The method of claim 14, wherein the major magnetic member is disposed within the bridge portion such that it is recessed.

21. The method of claim 20, wherein the minor magnetic member is disposed within the upward lip of the grip extension such that the minor magnet member is not flush with the front side of the upward lip; but, rather, is elevated from a front surface of the upward lip, thereby extending or protruding from the front side of the upward lip.

22. The method of claim 21, wherein the minor magnetic member in the auxiliary frame is inserted into the recess or aperture on the rear side of the bridge portion of the primary lens frame, said major and minor magnetic members then magnetically coupling together.

* * * * *